United States Patent

Miyamoto et al.

[11] Patent Number: 5,984,647
[45] Date of Patent: Nov. 16, 1999

[54] PROCESS FOR PRODUCING A HERMETIC ELECTRIC COMPRESSOR

[75] Inventors: Fumiyuki Miyamoto; Yoshinori Shirafuji; Shinobu Ogasawara; Yasushi Akahori, all of Tokyo; Hitoshi Tokuyama; Yukio Hidaka, both of Sanda; Hirofumi Fujioka, Tokyo, all of Japan

[73] Assignee: Mitsubishi Denki Kabushiki Kaisha, Tokyo, Japan

[21] Appl. No.: 09/052,982

[22] Filed: Apr. 1, 1998

[30] Foreign Application Priority Data

Apr. 3, 1997 [JP] Japan ................................ 9-85114

[51] Int. Cl.$^6$ ............................. F04B 17/03; F25B 31/02
[52] U.S. Cl. ................................. 417/410.1; 417/410.3; 417/423.7; 29/596; 62/114; 310/45; 427/104; 427/517; 427/519; 522/24
[58] Field of Search ........................... 417/423.7, 410.3, 417/410.1; 310/45; 29/596; 427/104, 116, 517, 518, 519; 522/24; 62/114

[56] References Cited

U.S. PATENT DOCUMENTS

| | | | |
|---|---|---|---|
| 4,254,351 | 3/1981 | Smith et al. | 310/45 |
| 4,401,962 | 8/1983 | Su et al. | 336/205 |
| 4,526,920 | 7/1985 | Sakashita et al. | 522/78 |
| 4,616,407 | 10/1986 | Tamaki et al. | 29/596 |
| 5,110,873 | 5/1992 | Kono et al. | 525/305 |
| 5,466,492 | 11/1995 | Kiessling et al. | 427/116 |

FOREIGN PATENT DOCUMENTS

| | | |
|---|---|---|
| 0 110 582 | 6/1984 | European Pat. Off. |
| 2 372 496 | 6/1978 | France . |
| 2 386 567 | 11/1978 | France . |
| 55-166467 | 12/1980 | Japan . |
| 80108855 | 11/1980 | Taiwan . |
| 189848 | 9/1992 | Taiwan . |
| 1130026 | 10/1968 | United Kingdom . |
| 1 594 025 | 7/1981 | United Kingdom . |
| WO 95/25760 | 9/1995 | WIPO . |

*Primary Examiner*—Andrew M. Dollnar
*Attorney, Agent, or Firm*—Oblon, Spivak, McClelland, Maier & Neustadt, P.C.

[57] ABSTRACT

A process for producing a hermetic electric compressor for a refrigerating or air-conditioning apparatus using a refrigerant having a hydrofluorocarbon base which comprises a motor unit, a compressing unit driven by the motor unit and a sealed housing enclosing the motor unit and the compressing unit and stores a refrigeration oil on the bottom of the sealed housing, wherein a solventless varnish comprising a thermosetting resin having at least two (meth)acryloyl groups in one molecule, a low-viscosity vinyl or 1-alkylvinyl monomer having an ether or ester linkage as a reactive diluent and an organic peroxide as a reaction initiator is used as an insulating varnish to insulate and fix the magnet wires of the stator of the motor unit, and the solventless varnish is cured by heating at a temperature of from 153 to 180° C. for from 0.5 to 3.5 hours.

12 Claims, 2 Drawing Sheets

PROCESS FOR PRODUCING A HERMETIC ELECTRIC COMPRESSOR

BACKGROUND OF THE INVENTION

1. Field of the Invention

The present invention relates to a hermetic electric compressor for refrigerating or air-conditioning apparatuses such as refrigerators and air-conditioners.

2. Discussion of Background

A hermetic electric compressor has a structure shown in its partial diagrams, FIGS. 1(a) and (b), and in its diagram, FIG. 2. The sealed housing 1 encloses a motor unit 2 consisting of a stator and a rotor and a compressing unit 3 driven by the motor unit 2 and retains a refrigeration oil 4 on the bottom. The motor unit 2 consists of a stator fixed to the sealed housing 1 along the outer periphery and a rotor which is held to leave a certain clearance from the inner periphery of the stator and connected to the compressing unit 3 via a crankshaft 5, and one of the magnet wires 6 in the stator is connected to a sealing power supply terminal 7 on the sealed housing 1 for electric power supply.

As shown in FIG. 1, the stator comprises a tubular layered iron core 8 with several slots 9 axially cut on the inner wall, magnet wires 6 fitted in the slots 9, insulating films 10 interposed between the core 8 and the magnet wires 6 and between the magnet wires 6 and binding strings 11 bundling the magnet wires 6. Conventionally, the magnet wires 6 are impregnated with an impregnating varnish 12 (an insulating varnish) such as a solventless polyester resin varnish comprising styrene as a reactive diluent or an epoxy/phenol type or epoxy type solvent-based varnish.

However, because a lot of volatile components vaporize from conventional solventless varnishes or solvent-based varnishes during the treatment, improvements are necessary in the view of hygienic safety and as measures against the odor.

In addition, because these impregnating varnishes are used with a refrigerant system comprising a fluorocarbon (refrigerant)/a refrigeration oil, they have to have high resistance to the refrigerant system such as lasting mechanical strength and little extractability into the refrigerant system.

On the other hand, although conventionally used chlorofluorocarbons such as dichlorodifluoromethane (R-12) and hydrochlorofluorocarbons such as monochlorodifluoromethane (R-22) are being replaced by hydrofluorocarbons such as 1,1,1,2-tetrafluoroethane (R-134a) as alternative refrigerants containing no chlorine atoms in molecules under the Freon controls stemming from the destruction of the ozone layer, conventionally used refrigeration oils of the mineral oil type or the alkylbenzene type are not compatible with polar hydrofluorocarbons. Therefore, polar refrigeration oils of the polyalkylene glycol, ester and ether types, which are compatible with hydrofluorocarbons, are being used as alternative refrigeration oils.

The motor unit in the sealed housing is exposed to the mixture of a refrigerant and a refrigeration oil having a high temperature and a high pressure whenever the hermetic electric compressor is in operation. Because alternative refrigerants (hydrofluorocarbons) and alternative refrigeration oils (refrigeration oils of the polyalkylene glycol, ester and ether types) are highly polar as compared with conventional refrigerants and refrigeration oils, they degrade or dissolve organic materials constituting a stator of a conventional motor unit such as insulating films and binding strings and varnish materials for impregnating varnishes and can cause problems such as damage to parts in the circuit of a refrigerating or air-conditioning apparatus or to insulation.

In particular, because conventional varnish materials are composed of monomers with little polarity such as styrene, oligomers extracted from a cured varnish which are incompatible with alternative refrigeration oils precipitate in the refrigerant system comprising an alternative refrigerant/an alternative refrigeration oil and accumulate as sludge in narrows such as capillaries or an expansion valve in the refrigerating or air-conditioning cycle and cause troubles by clogging these narrows during long-time operation.

On the other hand, conventionally used solvent-based varnishes have a problem of a large energy loss during the curing step because they contain not less than 50 wt % of a solvent which irrelevant to the curing reaction as a diluent. In addition, poor working environments and air pollution due to released solvents are a big problem in more environmentally regulated these days.

SUMMARY OF THE INVENTION

The present invention is accomplished in view of the above-mentioned prior art and aimed at providing a process for producing a reliable hermetic electric compressor using a refrigerant system consisting of an alternative hydrofluorocarbon refrigerant such as R-134a, R-125, R-32, R-23, R-152a, R-407c, R-404a or R-410a an alternative refrigeration oil without the above-mentioned problems.

The present invention provides a process for producing a hermetic electric compressor for a refrigerating or air-conditioning apparatus using a refrigerant having a hydrofluorocarbon base which comprises a motor unit, a compressing unit driven by the motor unit and a sealed housing enclosing the motor unit and the compressing unit and stores a refrigeration oil on the bottom of the sealed housing, wherein a solventless varnish comprising a thermosetting resin having at least two (meth)acryloyl groups in one molecule, a low-viscosity vinyl or 1-alkylvinyl monomer having an ether or ester linkage as a reactive diluent and an organic peroxide as a reaction initiator is used as an insulating varnish to insulate and fix the magnet wires of the stator of the motor unit, and the solventless varnish is cured by heating at a temperature of from 153 to 180° C. for from 0.5 to 3.5 hours.

DETAILED DESCRIPTION OF THE PREFERRED EMBODIMENTS

Figure 1A:
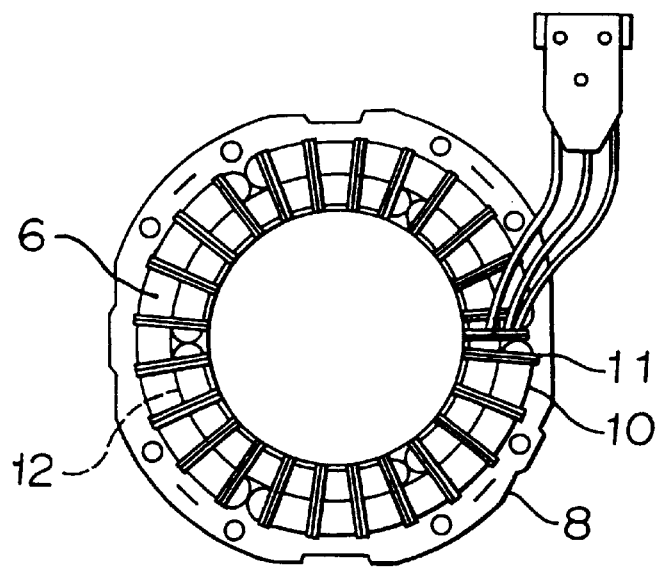
FIGS. 1(a) and 1(b) are a partial diagram explaining one embodiment of a hermetic electric compressor obtained by the process of the present invention, and (a) is a top view, and (b) is a side view.

One of the main features of the present invention is the use of a solventless varnish which is small in energy loss, hardly pollutes the air and comprises, as a reactive diluent, a monomer highly compatible with alternative refrigeration oils of the alkylene glycol, ester and ether types, as an insulating varnish, and the coils of the motor unit for a hermetic electric compressor are insulated by curing the solventless varnish.

Another main feature is that incorporation of a metal salt of an organic acid into the solventless varnish to improves the surface drying characteristics and thereby decreases the amount of the extract from the cured varnish even in the presence of a conventional incompatible refrigeration oil such as a naphthene or paraffin mineral oil or an alkylbenzene type oil.

The solventless varnish used in the present invention is, as described above, prepared by mixing a thermosetting resin (a base polymer) having at least two (meth)acryloyl groups in one molecule, and as a reactive diluent compatible with alternative refrigeration oils of the polyalkylene glycol, ester and ether types, a low-viscosity vinyl monomer having an ether linkage or an ester linkage or a low-viscosity 1-alkylvinyl monomer having an ether linkage or an ester linkage (hereinafter the low-viscosity vinyl monomer and the low-viscosity 1-alkylvinyl monomer are referred to as the low-viscosity vinyl monomer collectively), and if necessary, a polyfunctional vinyl monomer having at least three (meth)acryloyl or allyl groups in one molecule and an organic peroxide as a reaction initiator, and in addition, if necessary a metal salt of an organic acid and a photoinitiator.

The base polymer is a thermosetting resin having at least two (meth)acryloyl groups in one molecule, and for example, an epoxy acrylate resin (a vinyl ester resin), an unsaturated polyester resin and a urethane linkage-containing acrylic resin may be mentioned. Among them, an epoxy acrylate resin is particularly preferred because of its low extractability in the refrigerant system consisting of an alternative refrigerant/an alternative refrigeration oil and high resistance to hydrolysis.

As the epoxy acrylate resin, for example, a compound represented by general formula (I):

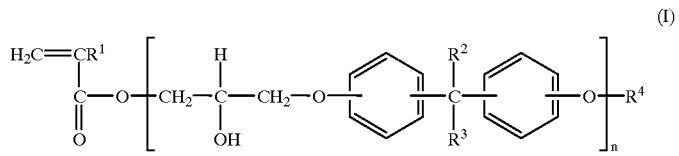

(wherein $R^1$, $R^2$ and $R^3$ are independently H or $CH_3$, $R^4$ is a group represented by the general formula:

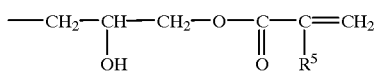

(wherein $R^5$ is H or $CH_3$), and n is an integer of from 1 to 6), a compound represented by general formula (II):

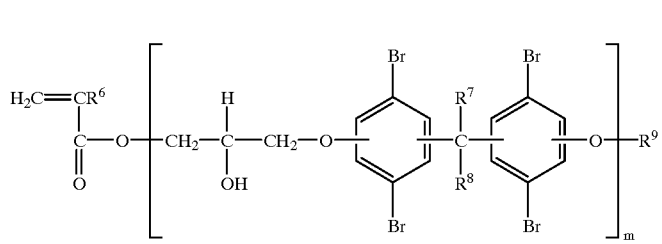

(wherein $R^6$, $R^7$ and $R^8$ are independently H or $CH_3$, $R^9$ is a group represented by the general formula:

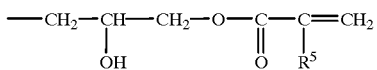

(wherein $R^5$ is the same as defined above), and m is an integer of from 1 to 6), and a compound represented by general formula (III):

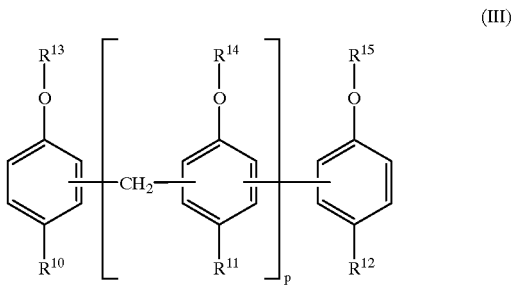

(wherein $R^{10}$, $R^{11}$ and $R^{12}$ are independently H or $CH_3$, $R^{13}$, $R^{14}$ and $R^{15}$ are groups represented by the general formula:

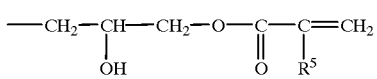

(wherein $R^5$ is the same as defined above), and p is an integer of from 1 to 6) may be mentioned. These compounds may be used alone or in mixture of at least two.

As the unsaturated polyester resin, for example, an unsaturated polyester resin represented by the general formula:

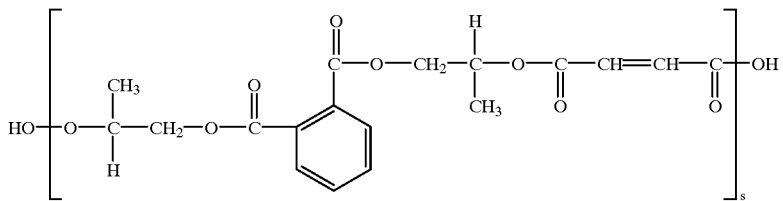

(wherein s is an integer of from 1 to 8), which is prepared from propylene glycol, phthalic anhydride and maleic anhydride may be mentioned.

As the urethane linkage-containing acrylic resin, for example, the phenyl glycidyl ether acrylate hexamethylenediisocyanate urethane polymer represented by a formula:

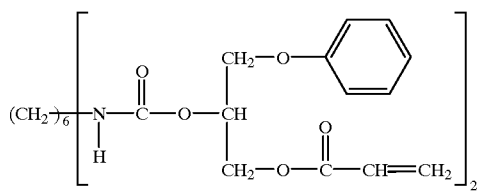

may be mentioned.

The above-mentioned reactive diluent used in the present invention is a low-viscosity monomer compatible with alternative refrigeration oils such as polyalkylene glycol oils, ester oils and ether oils. The low-viscosity vinyl monomer is a vinyl or 1-alkylvinyl monomer having an ether or ester linkage in molecule, and for example, a compound represented by general formula (IV):

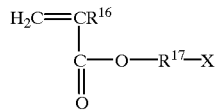 (IV)

(wherein $R^{16}$ is a hydrogen atom or a $C_{1-5}$ alkyl group, $R^{17}$ is $-(CH_2)_q-$ (wherein q is an integer of from 1 to 6) or $-(CH(R^{18})O)_r-$ (wherein $R^{18}$ is a hydrogen atom or a $C_{1-5}$ alkyl group, and r is an integer of from 1 to 6), and X is H, OH or $OCO(R^{19})$ (wherein $R^{19}$ is a $C_{1-5}$ alkyl group, a vinyl group or a 1-alkylvinyl group having a $C_{1-5}$ alkyl group) such as 2-hydroxyethyl (meth)acrylate, 2-hydroxypropyl (meth)acrylate, lauryl (meth)acrylate or ethoxydiethylene glycol (meth)acrylate; or a compound represented by general formula (V):

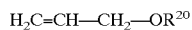 (V)

(wherein $R^{20}$ is a hydrogen atom or a group represented by the formula:)

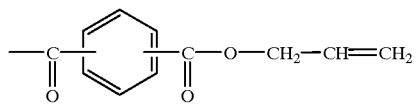

may be mentioned. These compounds may be used alone or in mixture of at least two. Among them, 2-hydroxyethyl (meth)acrylate and 2-hydroxypropyl (meth)acrylate are preferred because they are excellent in compatibility with alternative refrigeration oils.

The ratio of the thermosetting resin to the low-viscosity vinyl monomer (thermosetting resin/low-viscosity vinyl monomer (weight ratio)) is at least 15/85, preferably at least 30/70 in view of the resistant of the cured solventless varnish, particularly, the extractability into the refrigerant system and in order to eliminate the risk of a varnish too viscous to impregnate coils of an electric compressor, the ratio is at most 90/10, preferably at most 70/30.

In the present invention, in order to increase the crosslink density of a cured solventless varnish and further reduce the extract into the refrigerant system consisting of an alternative refrigerant/an alternative refrigeration oil, a polyfunctional vinyl monomer having at least 3, preferably from 3 to 6 (meth)acryloyl or allyl groups in one molecule may be incorporated as a reactive diluent, if necessary.

The polyfunctional vinyl monomer is, for example, an ester or ether obtained by reacting a carboxylic acid such as trimellitic acid or pyromellitic acid or an alcohol such as trimethylolpropane, trihydroxyethyl isocyanurate or pentaerythritol with a vinyl group-containing monomer such as acrylic acid, methacrylic acid or allyl alcohol, and is preferably trimethylolpropane trimethacrylate, the triacrylate of tris(2-hydroxyethyl) isocyanurate or dipentaerythritol hexaacrylate.

The polyfunctional vinyl monomer may replace part of the low-viscosity vinyl monomer highly compatible with alternative refrigeration oils such as polyalkylene glycol oil, ester oil and ether oil. The polyfunctional vinyl monomer is incorporated in an amount at least 5 wt %, preferably at least 30 wt %, based on the low-viscosity vinyl monomer, to further reduce the extract into the refrigerant system consisting of an alternative refrigerant/an alternative refrigeration oil, but not more than 60 wt %, preferably not more than 50 wt %, based on the low-viscosity vinyl monomer, to eliminate the risk of cracking problems with the cured product due to the shrinkage during curing.

The organic peroxide used as a reaction initiator in the present invention is not particularly limited, and peroxides of the perhexyl type such as t-hexyl hydroperoxide, acyl peroxides such as benzoyl peroxide, peracid esters such as t-butyl peroxybenzoate, organic hydroperoxides such as tetramethylbutyl hydroperoxide and dialkyl peroxides such as dicumyl peroxide are preferably mentioned.

The organic peroxide is incorporated in an amount of at least 0.1 part by weight, preferably at least 0.5 part by weight based on 100 parts by weight of the solventless varnish in order not to badly impair the curability of the solventless varnish, and at most 5 parts by weight, preferably at most 3 parts by weight based on 100 parts by weight of the solventless varnish in order not to extremely shorten the pot life of the solventless varnish.

In addition, according to the present invention, a metal salt of an organic acid may be incorporated in the solventless varnish in order to suppress extraction into conventional incompatible refrigeration oils such as naphthene and paraffin mineral oils and alkylbenzene oils. Combined use of such a metal salt of an organic acid with a base polymer improves the surface curability of the solventless varnish and reduces the extract.

As the metal salt of an organic acid, salts of organic acids such as octylic acid and naphthenic acid with metals such as Co, Mn, Sn, Ni, Zn, Pb, Cr and Fe may, for example, be mentioned. Preferred are cobalt naphthenate, manganese naphthenate, tin naphthenate, nickel naphthenate, zinc naphthenate, lead naphthenate, chrome naphthenate and iron naphthenate.

The metal salt of an organic acid is incorporated in an amount of at least 0.01 part by weight, preferably at least 0.03 part by weight based on 100 parts by weight of the solventless varnish in order to improve the surface curability of the solventless varnish, and at most 3 parts by weight, preferably at most 1.5 parts by weight based on 100 parts by weight of the solventless varnish not to impair the pot life property of the solventless varnish.

Further, in the present invention, a photo-initiator may be incorporated in the solventless varnish as another reaction initiator so as to allow ultraviolet curing of the solventless varnish. If ultraviolet curing can be employed, it is possible to suppress vaporization of monomers during curing of the varnish and greatly lessen pollution of the working environment or the air.

The photo-initiator used in the present invention is not particularly limited, and for example, benzoin ether type compounds such as benzoin isobutyl ether and hydroxycyclohexyl phenyl ketone, benzyl ketal compounds such as dimethylbenzyl ketal, acetophenone derivatives such as 1-phenyl-2-hydroxy-2-methylpropan-1-one and ketone compounds such as 4,4-bis(dimethylaminobenzophenone) are preferably mentioned.

The photo-initiator is incorporated in an amount of at least 0.5 part by weight, preferably at least 0.8 part by weight based on 100 parts by weight of the solventless varnish in order to fully develop the ultraviolet curability of the solventless varnish, and at most 20 parts by weight, preferably at most 10 parts by weight based on 100 parts by weight of the solventless varnish in order not to be extracted from the cured varnish into the refrigerant and contaminate the refrigerant system.

One of the main features of the process for producing a hermetic electric compressor of the present invention is the use of the solventless varnish as an insulating varnish to insulate and fix the magnet wires of the stator of the motor unit.

The solventless varnish does not have to be prepared by any particular methods, and may be prepared by homogeneously mixing appropriate amounts of a thermosetting resin, a low-viscosity vinyl monomer and an organic peroxide, and if necessary, a polyfunctional vinyl monomer, a metal salt of an organic acid and a photo-initiator into a homogeneous solution.

After the solventless varnish thus obtained is allowed to impregnate magnet wires (coils) of a stator for a motor unit, the varnish is cured by heating at a specific temperature for a specific. The resulting stator is fitted to a hermetic electric compressor. With respect to the curing conditions for the solventless varnish, the heating temperature is from 153° C., preferably from 155° C., to 180° C., preferably to 175° C., and the heating times is from 0.5 hour, preferably from 1 hour, to 3.5 hours, preferably to 3 hours. Such curing conditions can afford more electrically and mechanically excellent coils for electric compressors.

When the heating temperature or time is below the above-mentioned lower limit, part of the solventless varnish does not cure during the curing step to impair various electrical and mechanical properties. When the heating temperature or time is above the above-mentioned upper limit, the crosslinking reaction during the curing step is in bad balance and produce cracks in the insulator.

Thus, according to the process of the present invention, insulation of coils for electric compressors with a solventless varnish comprising a specific thermosetting resin, a specific low-viscosity vinyl monomer as a reactive diluent and an organic peroxide as a reaction initiator, and if necessary, a polyfunctional vinyl monomer as another reactive diluent, a metal salt of an organic acid and a photo-initiator cured by heating at a specific temperature for a specific period makes it possible to provide a hermetic electric compressor which hardly suffers locking of the circulation pathway or clogging of capillaries in the compressor caused by large amounts of oligomers precipitated in the refrigerant system consisting of a hydrous alternative refrigerant (a hydrofluorocarbon such as R-134a, R-125, R-32, R-23, R-152a, R-407c, R-404a and R-410a)/an incompatible or compatible refrigeration oil at a high temperature and a high pressure without a substantial energy loss during the curing step or air pollution.

Now, the process for producing a hermetic electric compressor of the present invention will be described in further detail with reference to Examples, but the present invention will not be restricted to these Examples.

An embodiment of the present invention will be described in detail by referring to the accompanying drawings.

Figure 1B:
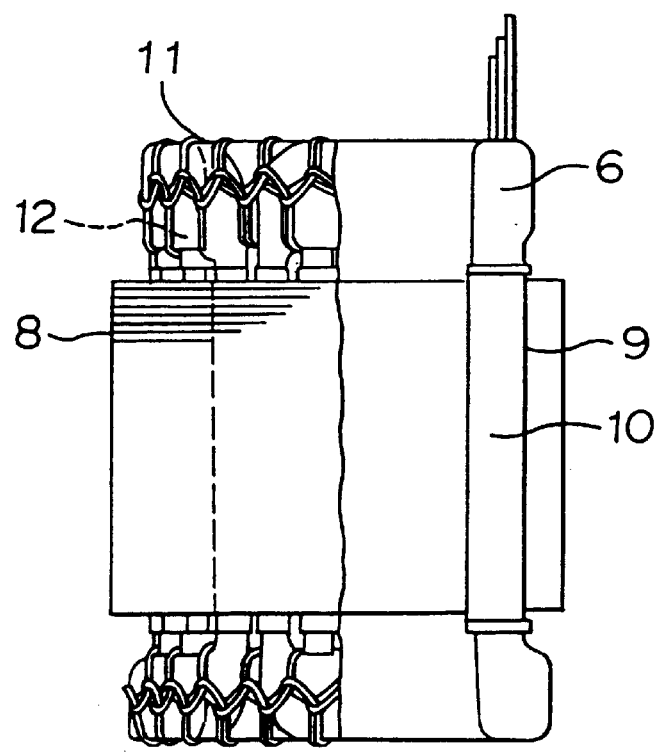
Figure 2:
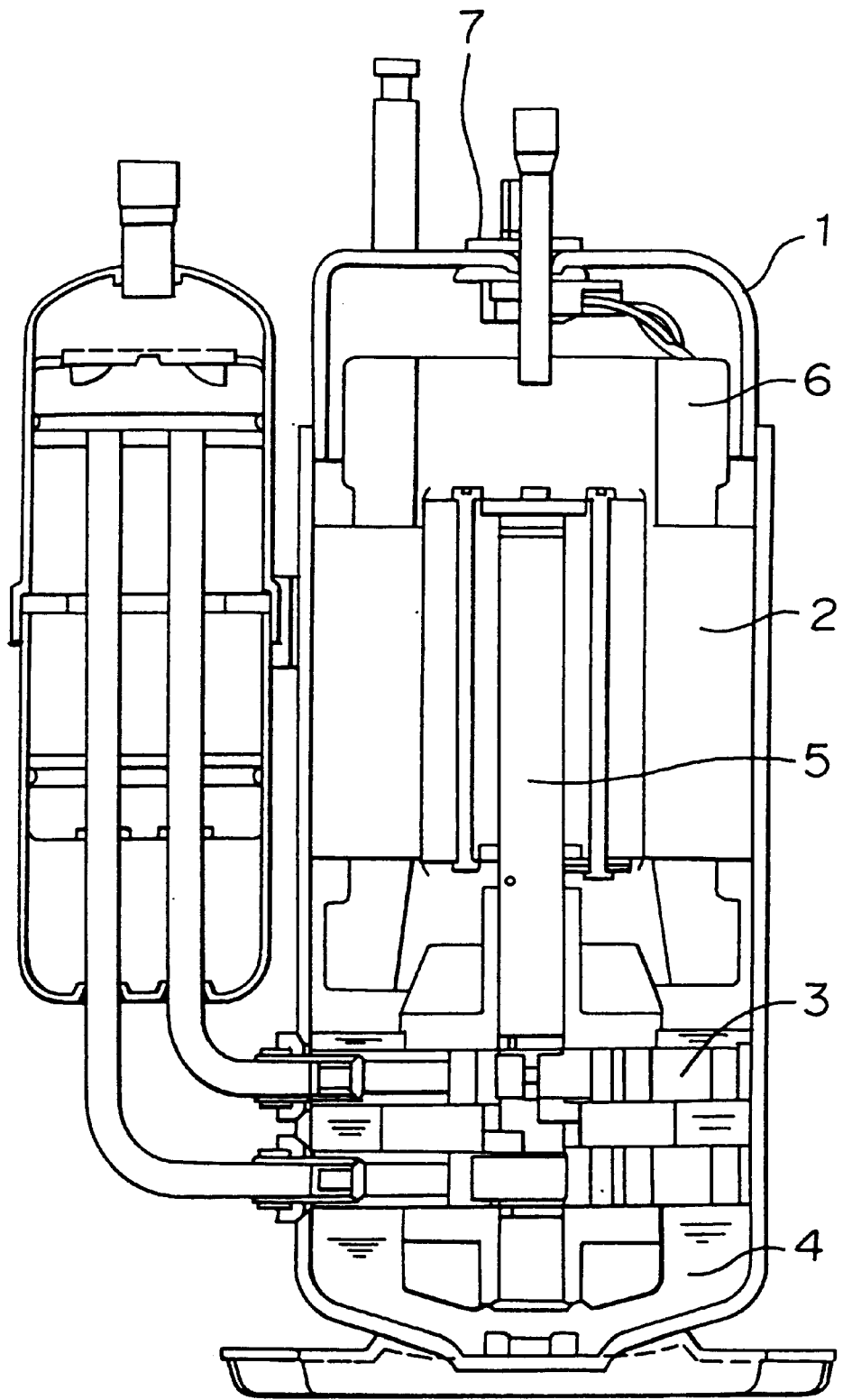
FIG. 2 is a diagram explaining one embodiment of a hermetic electric compressor obtained by the process of the present invention.

FIG. 1 and FIG. 2 illustrate one embodiment of a hermetic electric compressor obtained by the process of the present invention.

In FIGS. 1(*a*) and (*b*) and FIG. 2, a sealed housing 1 (a casing) encloses a motor unit 2 consisting of a stator and a rotor and a compressing unit 3 driven by the motor unit 2 and retains a refrigeration oil 4 on the bottom. The motor unit 2 consists of a stator fixed to the sealed housing 1 along the outer periphery and a rotor which is held to leave a certain clearance from the inner periphery of the stator and connected to the compressing unit 3 via a crankshaft 5, and one of the magnet wires 6 in the stator is connected to a sealing power supply terminal 7 on the sealed housing 1 for electric power supply.

As shown in FIG. 1, the stator comprises a tubular layered iron core 8 with several slots 9 axially cut on the inner side wall, magnet wires 6 fitted in the slots 9, insulating films 10 interposed between the core 8 and the magnet wires 6 and between the magnet wires 6 and binding strings 11 bundling the magnet wires 6. The magnet wires 6 are impregnated with a solventless varnish 12 as an insulating varnish for better insulation.

As the solventless varnish, a varnish comprising a thermosetting resin having at least two (meth)acryloyl groups in one molecule, a low-viscosity vinyl or 1-alkylvinyl monomer having an ether or ester linkage as a reactive diluent compatible with alternative refrigeration oils of the polyalkylene glycol, ester and ether types and an organic peroxide as a reaction initiator.

EXAMPLE 1

50 parts of an epoxy acrylate (of the bisphenol A type having two acryloyl groups in one molecule and a number average molecular weight of about 520) as a based polymer, 30 parts by weight of 2-hydroxypropyl methacrylate and 20 parts by weight of 2-hydroxypropyl acrylate as reactive diluents, 1 part by weight of t-butyl peroxybenzoate as an organic peroxide, and 0.05 part by weight of cobalt naphthenate as a metal salt of an organic acid were mixed homogeneously into a solution to give an insulating varnish (a solventless varnish).

The insulating varnish was allowed to impregnate the magnet wires 6 of a stator for a hermetic electric compressor shown in FIG. 1 and cured by heating at 160° C. for 3 hours, and the stator was built in an actual hermetic electric compressor shown in FIG. 2.

The compressor was integrated into a simulated refrigeration cycle for evaluation to be checked for visual changes of the coils and formation of sludge in the presence of a refrigerant/a refrigeration oil. After 4 kg of a hydrofluorocarbon, R-407C (a trinary refrigerant comprising R-134a/R-125/R-32, manufactured by Asahi Glass Company Ltd.) as a refrigerant and 1.6 kg of a compatible ester oil (Fleol α, manufactured by Nippon Oil Co., Ltd.) were sealed in, an accelerated reliability test was carried out for 2000 hours.

The refrigerant or air was passed at a constant pressure (0.49 N/m²) through the pipe line, and the outflow was measured by a flowmeter, and the flow decline ratio at the narrows in the compressor during 2000 hours of operation, based on the outflow before the operation was calculated in accordance with the following formula.

Flow decline ratio (%)=(the outflow after 2000 hours of operation/the outflow before 2000 hours of operation)×100

The larger the flow decline ratio, the less the flow rate at the narrows decreased.

The compressor was dismantled, and the visual changes of the expansion valve and the pipeline were inspected with the naked eye and rated on the basis of the following standards.

(Evaluation standards for visual changes)
o: No change
ΔA: A slight change
X: A significant change
The results are shown in Table 1.

EXAMPLE 2

45 parts by weight of an epoxy acrylate (of the novolak type, having two acryloyl groups in one molecule and a number average molecular weight of about 1000) as a base polymer, 40 parts by weight of 2-hydroxyethyl methacrylate and 15 parts by weight of trimethylolpropane trimethacrylate as reactive diluents, 1 part by weight of t-butyl peroxybenzoate as an organic peroxide, and 0.05 part by weight of cobalt naphthenate as a metal salt of an organic acid were mixed homogeneously into a solution to give an insulating varnish (a solventless varnish).

By using the insulating varnish, an actual compressor was produced under the same conditions as in Example 1. The compressor was integrated into a simulated refrigeration cycle for evaluation to be checked for visual changes of the coils and formation of sludge in the presence of a refrigerant/a refrigeration oil. After 4 kg of the same refrigerant, R-407C, as in Example 1 and 1.5 kg of the same compatible ester oil as used in Example 1 as a refrigeration oil were sealed in, an accelerated reliability test was carried out for 2000 hours.

After 2000 hours of operation, the flow decline ratio at the narrows in the compressor was determined, and the visual changes of the expansion valve and the pipeline were evaluated after dismantling of the compressor, in the same manners as in Example 1. The results are shown in Table 1.

EXAMPLE 3

The insulating varnish prepared in the same manner as in Example 1 was allowed to impregnate magnet wires 6 of a stator for a hermetic electric compressor shown in FIG. 1 and cured by heating at 175° C. for 2 hours, and the stator was built in an actual hermetic electric compressor shown in FIG. 2.

The compressor was integrated into a simulated refrigeration cycle for evaluation to be checked for visual changes of the coils and formation of sludge in the presence of a refrigerant/a refrigeration oil. After 4 kg of the same refrigeration, R-407C as in Example 1 and 1.6 kg of an incompatible paraffin mineral oil (Diamond Freeze, manufactured by Mitsubishi Oil Co., Ltd.) and an alkylbenzen oil (Dafnee CF, manufactured by Idemitsu Kosan) were sealed in, an accelerated reliability test was carried out for 2000 hours.

After 2000 hours of operation, the flow decline ratio at the narrows in the compressor was determined, and the visual changes of the expansion valve and the pipeline were evaluated after dismantling of the compressor, in the same manners as in Example 1. The results are shown in Table 1.

EXAMPLE 4

To the varnish prepared in Example 1, 1 part by weight of benzoin isobutyl ether as a photo-initiator was added and dissolved homogeneously to give an insulating varnish (a solventless varnish).

The resulting insulating varnish was allowed to impregnate magnet wires 6 of a stator for a hermetic electric compressor shown in FIG. 1, then exposed to ultraviolet light from a high pressure mercury lamp (power: 160 W/cm) at a distance of 15 cm for about 60 seconds, and cured by heating at 155° C. for 2 hours. During the heat curing, the varnish did not run at all because the surface of the varnish had been cured rapidly by the ultraviolet curing, although without the ultraviolet curing, the varnish would have run, and vaporization of monomers was suppressed greatly. Then, the stator was built in an actual hermetic electric compressor shown in FIG. 2.

The compressor was integrated into a simulated refrigeration cycle for evaluation to be checked for visual changes of the coils and formation of sludge in the presence of a refrigerant/a refrigeration oil. After 4 kg of the same refrigerant, R-407C as in Example 1 and 1.6 kg of the same compatible ester oil as in Example 1 were sealed in, an accelerated reliability test was carried out for 2000 hours.

After 2000 hours of operation, the flow decline ratio at the narrows in the compressor was determined, and the visual changes of the expansion valve and the pipeline were evaluated after dismantling of the compressor, in the same manners as in Example 1. The results are shown in Table 1.

COMPARATIVE EXAMPLE 1

45 parts by weight of an unsaturated polyester resin (having a number average molecular weight of about 4000) as a base polymer, 55 parts by weight of styrene as a reactive diluent, 1 part by weight of t-butyl peroxybenzoate as an organic peroxide and 0.05 part by weight of cobalt naphthenate as a metal salt of an organic acid were mixed homogeneously into a solution to give an insulating varnish.

The insulating varnish was allowed to impregnate the magnet wires 6 of a stator for a hermetic electric compressor shown in FIG. 1 and cured by heating at 160° C. for 2 hours, and the stator was built in an actual hermetic electric compressor shown in FIG. 2.

The compressor was integrated into a simulated refrigeration cycle for evaluation to be checked for visual changes of the coils and formation of sludge in the presence of a refrigerant/a refrigeration oil. After 4 kg of the same refrigerant, R-407C as in Example 1 and 1.6 kg of the same incompatible paraffin mineral oil and alkylbenzen oil as in Example 3 as a refrigeration oil were sealed in, an accelerated reliability test was carried out for 2000 hours.

After 2000 hours of operation, the flow decline ratio at the narrows in the compressor was determined, and the visual changes of the expansion valves and the pipeline were evaluated after dismantling of the compressor, in the same manners as in Example 1. The results are shown in Table 1.

COMPARATIVE EXAMPLE 2

60 parts by weight of the same epoxy acrylate as used in Example 1 as a base polymer, 40 parts by weight of 2-hydroxyethyl methacrylate as a reactive diluent and 1 part by weight of t-butyl peroxybenzoate as an organic peroxide were mixed homogeneously into a solution to give an insulating varnish.

The insulating varnish was allowed to impregnate the magnet wires 6 of a stator for a hermetic electric compressor shown in FIG. 1 and cured by heating at 150° C. for 2 hours, and the stator was built in an actual hermetic electric compressor shown in FIG. 2.

The compressor was integrated into a simulated refrigeration cycle for evaluation to be checked for visual changes of the coils and formation of sludge in the presence of a refrigerant/a refrigeration oil. After 4 kg of the same refrigerant, R-407C as in Example 1 and 1.6 kg of the same compatible ester oil as in Example 1 as a refrigeration oil were sealed in, an accelerated reliability test was carried out for 2000 hours.

After 2000 hours of operation, the flow decline ratio at the narrows in the compressor was determined, and the visual changes of the expansion valve and the pipeline were evaluated after dismantling of the compressor, in the same manners as in Example 1. The results are shown in Table 1.

TABLE 1

| | | Results of accelerated reliability test | |
|---|---|---|---|
| Example No. | Refrigerant/ Refrigeration Oil | Flow decline ratio at narrows (%) | Visual change |
| 1 | R-407C/Ester oil | 99 | ○ |
| 2 | R-407C/Ester oil | 96 | ○ |
| 3 | R-407C/ Paraffin mineral oil + Alkylbenzene oil | 99 | ○ |
| 4 | R-407C/Ester oil | 98 | ○ |
| Comparative Example 1 | R-407C/ Paraffin mineral oil + Alkylbenzene oil | 88 | Δ |
| 2 | R-407C/Ester oil | 95 | X |

The results in Table 1 indicate that when the insulating varnishes prepared in Examples 1 to 4 were used, the flow rate at the narrows did not decrease at all, the expansion valves and the pipeline did not visually change, and the accelerated reliability was extremely good.

In contrast, when the insulating varnish prepared in Comparative Example 1 which contained styrene as a reactive diluent, the amount of the extract was large, the expansion valve and the pipeline visually had changed with a large amount of sludge in them when the compressor was dismantled, and the flow rate at the narrows decreased significantly.

In Comparative Example 2, because the insulating varnish was cured at a low temperature, the uncured varnish extracted a lot and as a result, drastic visual changes occurred.

According to the process of the present invention, insulation of coils for electric compressors with a solventless varnish comprising a specific thermosetting resin as a base polymer, a specific low-viscosity vinyl monomer as a reactive diluent and an organic peroxide as a reaction initiator, and if necessary, a polyfunctional vinyl monomer, a metal salt of an organic acid and a photo-initiator cured by heating at a specific temperature for a specific period makes it possible to provide a hermetic electric compressor which hardly suffers locking of the circulation pathway or clogging of capillaries in the compressor caused by large amounts of oligomers precipitated in the refrigerant system consisting of a hydrous alternative refrigerant/an incompatible or compatible refrigeration oil at a high temperature and a high pressure without a substantial energy loss during the curing step or air pollution. The electric compressor is extremely useful as a hermetic electric compressor for a refrigerating or air-conditioning apparatus using a refrigerant mainly composed of an alternative Freon such as hydrofluorocarbons developed to prevent destruction of the ozone layer.

What is claimed is:

1. A process for producing a hermetic electric compressor, which comprises a motor unit; a compressing unit driven by the motor unit; and a sealed housing enclosing a refrigeration oil on a bottom of the sealed housing, the motor unit and the compressing unit, the process comprising
   using a solventless varnish comprising
      a thermosetting resin having at least two (meth)acryloyl groups in each resin molecule;
      a reactive diluent including a vinyl or 1-alkylvinyl monomer having an ether or ester linkage; and
      a reaction initiator including an organic peroxide to insulate and fix magnet wires of a stator of the motor unit, and
   curing the solventless varnish at a temperature of from 153° C. to 180° C. for 0.5 to 3.5 hours.

2. The process according to claim 1, wherein the reactive diluent further includes a polyfunctional vinyl monomer having at least three (meth)acryloyl or allyl groups.

3. The process according to claim 1, wherein the solventless varnish further comprises a metal salt of an organic acid.

4. The process according to claim 1, wherein the reaction initiator further includes a photo-initiator.

5. A hermetic electric compressor comprising
   a motor unit including magnet wires coated with a cured solventless varnish;
   a compressing unit driven by the motor unit; and
   a sealed housing enclosing a refrigeration oil on a bottom of the scaled housing, the motor unit and the compressing unit, wherein
   the cured solventless varnish is produced by curing a solventless varnish comprising
      a thermosetting resin having at least two (meth)acryloyl groups in each resin molecule;
      a reactive diluent including a vinyl or 1-alkylvinyl monomer having an ether or ester linkage; and
      a reaction initiator including an organic peroxide.

6. The hermetic electric compressor according to claim 5, wherein the reactive diluent further includes a polyfunctional vinyl monomer having at least three (meth)acryloyl or allyl groups.

7. The hermetic electric compressor according to claim 5, wherein the solventless varnish further comprises a metal salt of an organic acid.

8. The hermetic electric compressor according to claim 5, wherein the reaction initiator further includes a photo-initiator.

9. A method of operating a refrigerating or air-conditioning apparatus, the method comprising using the hermetic electric compressor of claim 5 with a refrigerant having a hydrofluorocarbon base.

10. A method of operating a refrigerating or air-conditioning apparatus, the method comprising using the hermetic electric compressor of claim 6 with a refrigerant having a hydrofluorocarbon base.

11. A method of operating a refrigerating or air-conditioning apparatus, the method comprising using the hermetic electric compressor of claim 7 with a refrigerant having a hydrofluorocarbon base.

12. A method of operating a refrigerating or air-conditioning apparatus, the method comprising using the hermetic electric compressor of claim 8 with a refrigerant having a hydrolfluorocarbon base.

* * * * *